United States Patent [19]

Sato

[11] Patent Number: 5,370,331
[45] Date of Patent: Dec. 6, 1994

[54] BAITCASTING REEL HAVING OPENABLE AND CLOSABLE LID

[75] Inventor: Jun Sato, Sakai, Japan

[73] Assignee: Shimano Inc., Osaka, Japan

[21] Appl. No.: 18,423

[22] Filed: Feb. 17, 1993

[30] Foreign Application Priority Data

Feb. 18, 1992 [JP] Japan .................. 4-006390[U]

[51] Int. Cl.[5] ............................. A01K 89/015
[52] U.S. Cl. .................... 242/313; 242/314; 242/315
[58] Field of Search ............ 242/310, 312, 313, 314, 242/315

[56] References Cited

U.S. PATENT DOCUMENTS 5,120,002 6/1992 Kawai .................. 242/314
5,127,603 7/1992 Morimoto .............. 242/313

FOREIGN PATENT DOCUMENTS 60-199334 10/1985 Japan .
2-81172 6/1990 Japan .

Primary Examiner—Katherine Matecki
Attorney, Agent, or Firm—Dickstein, Shapiro & Morin

[57] ABSTRACT

A baitcasing reel comprising a rotary member for taking up a fishing line thereto, right and left side bodies arranged in opposite sides of the rotary member, an opening defined in one of the right and left side bodies for allowing the rotary member to be removed therethrough, an openable and closable lid for exposing and closing the opening, a lock mechanism including engaging means and engaged means. The engaging means serves to lock the lock mechanism in a closed position thereof, while the engaged means being engageable with and disengageable from the engaging means. The baitcasting reel further comprises an unlock control member operable to act on the engaging means to disengage said engaging means from said engaged member, thereby to move the lock mechanism to an unlocking position. The unlock control member is moved from a contained position corresponding to a locking position to the unlocking position to be operable to open and close said lid.

10 Claims, 9 Drawing Sheets

BAITCASTING REEL HAVING OPENABLE AND CLOSABLE LID

BACKGROUND OF THE INVENTION

1. Field of the Invention

The present invention relates to baitcasting reels, and more particularly to a baitcasting reel including an opening defined in one of right and left side bodies provided in opposite sides of a rotary member for taking up a fishing line thereto and allowing the rotary member to be removed therethrough, an openable and closable lid for closing and exposing the opening, a lock mechanism operable to lock said lid in a closed position, and an unlock control member for moving the lock mechanism to an unlocking position.

2. Description of the Related Art

An example of conventional baitcasting reels as noted above comprises an openable and closable lid screwed to an opening defined in a side body, and a lid control member only used for attaching and detaching the lid to/from the side body. The lid is attachable and removable by the lid control member, while being locked and unlocked as attached to the side body by an unlock control member.

In order to remove the rotary member through the opening in such a conventional structure, the angler firstly unlocks the lid by the unlock control member and then shifts his or her hand to the lid control member to remove the lid, thereby to remove the rotary member. Thus, the angler has to carry out a two-step operation, i.e. to unlock the lid and subsequently remove the lid, which results in a time-consuming operation of shifting his or her hand from the unlock control member to the lid control member. Further, a locking position is set to a fixed position, which requires the lid to be attached to a predetermined position. However, the reel using a screw structure cannot determine the attaching position of the lid and thus is somewhat difficult to employ.

In view of the above, the same applicant proposes a means for solving such an operating problem in Japanese Utility Model Application "Kokai" No. 2-81172, for example. In this prior art, engaging means having a reduced width is defined in an end of the unlock control member, while engaged means is defined in an opening edge of the side body. When the unlock control member is set to a contained position corresponding to the locking position, the engaging means engages the engaged means, thereby to lock the lid. After the unlock control member is rotated from this position to project from the side body and assume a raised unlocking position, the angler holds the raised unlock control member and rotates the lid with the unlock control member to remove the lid.

Such a structure provides a good operative efficiency in that the angler only rotates the unlock control member switched to the unlocking position without shifting his or her hand.

However, since the unlock control member is also utilized as the lock mechanism, a reaction force required in a locking operation is applied to the unlock control member in the locking position. As a result, a primary operation of switching the unlock control member from the contained position to the unlocking position sometimes lacks in smoothness. More particularly, when the unlock control member is oscillated to shift from the contained position to the unlocking position, an oscillating direction is perpendicular to a rotating direction for screwing the lid to the reel. Therefore, the unlock control member receives a reaction force from the engaged means in the contained position in a direction perpendicular to the oscillating direction, which possibly prevents a smooth oscillation of the unlock control member during use for a long period.

SUMMARY OF THE INVENTION

A primary object of the present invention is to provide a reel in which an unlock control member is also used as an opening/closing control member for a lid to provide a good operative efficiency and is used stably for a long period.

Another object of the present invention is to provide a reel for readily attaching and detaching the lid to/from the reel.

A further object of the present invention is to provide a reel in which a position limiting mechanism for an unlock control member is added to maintain a locking position more stably.

A still further object of the present invention is to provide a reel in which a pre-operation for removing a rotary member for taking up a fishing line through an opening is easily and quickly effected.

In order to fulfill the above-noted objects, the present invention is characterized by a baitcasting reel comprising a rotary member for taking up a fishing line thereto, right and left side bodies arranged in opposite sides of the rotary member, an opening defined in one of the right and left side bodies for allowing the rotary member to be removed therethrough, an openable and closable lid for exposing and closing the opening, a lock mechanism serving to lock the lid in a closed position thereof, and an unlock control member for moving the lock mechanism to an unlocking position. The lock mechanism includes an engaging member receiving an operating force from an unlock control member to be retractable, and engaged recesses engageable with an disengageable from said engaging means. The unlock control member is moved from a contained position corresponding to a locking position to the unlocking position to be operable to open and close the lid.

The baitcasting reel according to the present invention has the following functions and effects.

In order to remove the rotary member, the unlock control member is set to the unlocking position, which allows the engaging member associated with the unlock control member to move away from the engaged recess thereby to release the locking position. The angler can remove the lid by operating the unlock control member in the unlocking position without shifting his or her hand. The rotary member is removed through the opening in this condition.

Thus, since the unlock control member is also used as a control member for attaching and detaching the lid, the angler can unlock and remove the lid in a series of successive operations without shifting his or her hand, which provides a good operative efficiency.

Further, the engaging member is provided as a component forming part of the lock mechanism for exclusive use, not using the unlock control member both as an unlocking means and a locking means. As a result, it is sufficient that the engaging member has durability only against a reaction force produced in the locking operation, while all the unlock control member is required is a structure for unlocking the lid, which does not deteriorate the operative properties of these members for a long period.

The reel of the present invention may be modified as follows:

The lid may define a plurality of pawls engageable with and disengageable from a plurality of engaging elements defined on an inner periphery of the opening. The lid is rotatable about an axis of the rotary member thereby to be attached to and detached from the opening.

This structure provides the following functions and effects.

Attachment and detachment of the lid is effected only by rotating the rotary member, and at the same time the lid is rotated by a predetermined angle to engage the engaging elements with the pawls thereby to fix and lock the lid. Since the lid is constantly fixed by this predetermined angle, it is sufficient to provide engaged recess forming part of the lock mechanism in a predetermined position thereby to facilitates arrangement of the lock mechanism. In addition, any special tools are not required for attachment and detachment of the lid.

A further modification of the reel according to the present invention is possible as follows:

The baitcasting reel may comprise a rotary member for taking up a fishing line thereto, right and left side bodies arranged in opposite sides of the rotary member, and an opening defined in one of said side bodies for allowing the rotary member to be removed therethrough, an openable and closable lid for exposing and closing the opening, a lock mechanism serving to lock the lid in a closed position thereof, an unlock control member operable to move the lock mechanism to an unlocking position, said lock mechanism including engaging member receiving an operating force from the unlock control member to be retractable and engaged recesses engageable with and disengageable from the engaging member, the unlock control member being operable to move from a contained position corresponding to a locking position to the unlocking position to be operable to open and close the lid, and a spring-ball mechanism provided between the lid and one of the side case for maintaining the unlock control member in the contained position.

This structure has the following functions and effects.

The lid is attached and fixed to the opening by operating the unlock control as set to the unlocking position. When the unlock control member is shifted to the contained position from that position, the spring-ball mechanism is operated to fix the unlock control member to the contained position. Thus, the position of the unlock control member per se is not changed but stabilized, as a result of which the locking position of the lid is also stabilized.

The present invention may be practiced further in the following manner.

Each of the side bodies may include a frame disposed adjacent to the rotary member and a case enclosing an outer face of the frame. The case is held by a shaft member extending from a reel body parallel to an axis of the rotary member, and pivotable about the axis of the shaft member and movable away from the frame in an axial direction of the shaft member under an urging force of a spring without falling off said shaft member. A rotatable lid is held by the case to be attachable to and detachable from the frame and urged to move away from the frame by a spring. Further, the case is attached and fixed to the frame by attaching the lid to the frame.

The lid is moved away from the frame, thereby to move the case away from the frame. An opening is defined in the frame at a position for mounting the lid for allowing the rotary member to be removed therethrough. The case is pivoted about the axis of the shaft member to expose said opening for removing the rotary member. A lock mechanism for locking the lid in a closed position thereof and an unlock control member for moving the lock mechanism to an unlocking position. The lock mechanism includes engaging member receiving an operating force from the unlock control member and engaged recesses engageable with and disengageable from the engaging member. The unlock control member is moved from a contained position corresponding to a locking position to the unlocking position to be operable to open and close the lid.

Such a structure has the following functions and effects.

When the unlock control member is set to the unlocking position to rotate the lid, the frame is disengaged from the lid. The lid is moved relative to the case, while being pushed with the case by a spring in a direction to move away from the frame to be free. The lid is rotated with case about an axis of the shaft member to expose the opening of the frame, thereby to allow the spool to be removed.

Thus, a series of successive operations of exposing the opening of the case and removing the spool is advantageously automatically carried out under the urging force of the spring only by rotating the lid.

Further, the reel of the present invention may have the following structure.

The baitcasting reel may comprise a side body including a frame and a case, a fixing mechanism for fixing the case attachable to and detachable from the frame to the frame, a lock mechanism for maintaining a fixed position established by the fixing mechanism, and an unlock control member operable to move in one direction to place the fixing mechanism in the fixed position thereby to attach the case to the frame, while being operable to move in the opposite direction to unlock the fixed position and place the fixing mechanism in a release position thereby to select between a first position to allow the case to be removed from the frame and a second position to prohibit the unlock control member from moving between the fixed position and the release position. The lock mechanism is interlocked with the unlock control member to select between an unlocking position at the first position and a locking position at the second position.

This structure performs following functions and effects.

In order to remove the case from the frame, the locking position is automatically released only by placing the unlock control member in the first position. The case can be removed from the frame only by moving the unlock control member as set to the unlocking position to release the fixed position. On the other hand, when the case is attached to the frame, the unlock control member is set to the second position, thereby to automatically establish the locking position and to maintain the fixed position of the case.

Thus, opening and closing operations, a locking operation and an unlocking operation can be advantageously effected only by operating the unlock control member.

The other objects, features and advantages of the invention will be apparent from the following descriptions referring to the accompanying drawings.

BRIEF DESCRIPTION OF THE DRAWINGS

The drawings show embodiment of a baitcasting reel according to the present invention, in which.

DETAILED DESCRIPTION OF THE PREFERRED EMBODIMENT

An embodiment of a baitcasting reel according to the present invention will be described in detail hereinafter referring to the drawings.

FIGS. 1 through 4 illustrate a baitcasting reel comprising right and left side bodies A and A', a level wind mechanism mounted forwardly between the side bodies, a spool 3 acting as a rotary member for taking up a fishing line thereto and mounted in an intermediate portion of the side bodies, and a clutch control member 4 mounted rearwardly of the side bodies. The baitcasting reel of the present invention further comprises a handle 5, a drag control member 6 and a cast controller 7, all of which are mounted on the right side body A'. The level wind mechanism is operable to sideways reciprocate a line guide 2 by rotation of a helical groove shaft 1.

Figure 9:
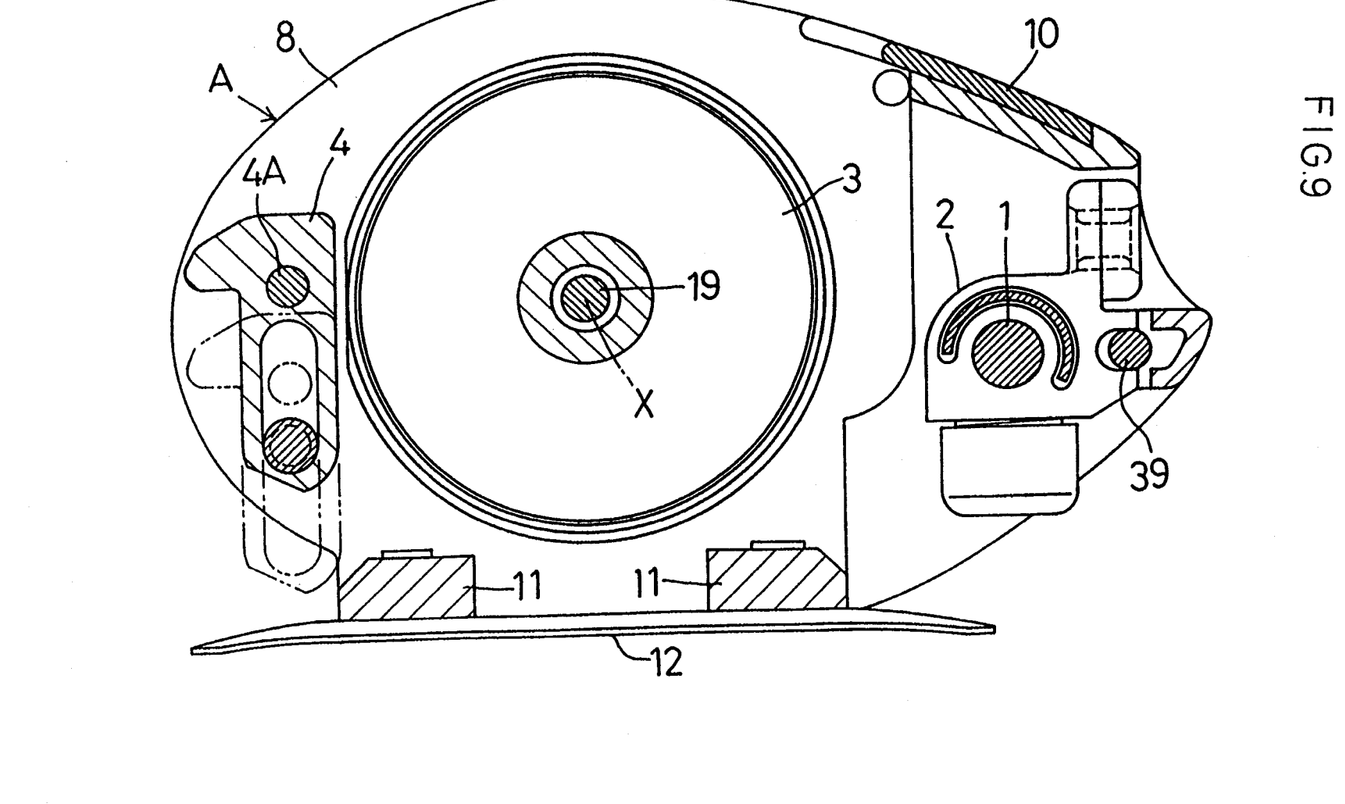
FIG. 9 is a side view of the reel in vertical section.

The right and left side bodies A and A' include first and second inner frames 8 and 8', and first and second cases 9 and 9' covering outer faces of the first and second frames 8 and 8', respectively. As shown in FIG. 9, these frames 8 and 8' are integral with an upper thumb rest 10 mounted upwardly between the frames 8 and 8' and with a pair of fore and aft lower frames 11 mounted downwardly of the frames. A pole mount 12 extends between the lower frames 11.

A handle shaft 13 is supported by the right side body A'. The handle 5 and the drag control member 6 are provided in portions projecting from the second case 9'. In inner end portions of the second case 9' are provided a drag mechanism D and an output gear 14. A roller-type one-way clutch 15 is mounted between the handle shaft 13 and the second case 9' for prevent reverse rotation of the handle 5 and transmitting drive from the handle 5 to an input gear 1A of the helical groove shaft 1 through the output gear 14.

A click mechanism includes a spring plate 17 disposed in a retainer 16 of the handle 5, and a disk 18 mounted on a face of the control member 6 adjacent to the handle to be engageable with and disengageable from the spring plate 17 thereby to generate a click sound. The angler perceives an amount of operation of the drag control member 6 through the click sound.

Figure 8:
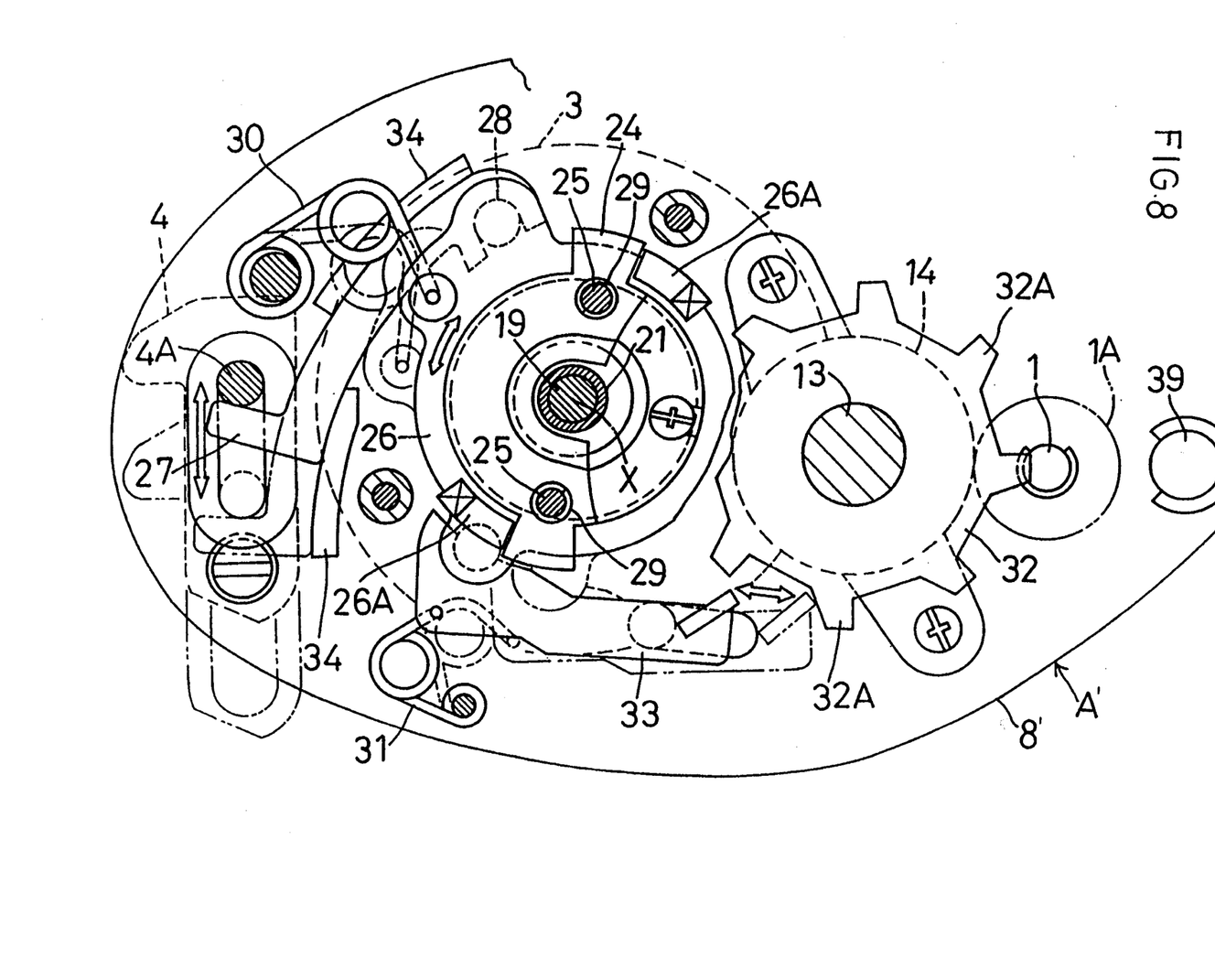
FIG. 8 is a side view in vertical section showing a clutch mechanism.

Referring to FIG. 8, a clutch mechanism C includes a clutch sleeve 21 slidably fitted on a spool shaft 19 supported by a plurality of bearings 20, and a pin 22 fixed to the spool shaft 19 and engageable with the clutch sleeve 21. An input gear 21A of the clutch sleeve 21 is meshed with an output gear 23 of the drag mechanism D, thereby to transmit an operating force of rotation from the handle 5 to the spool 3 through the drag mechanism D and the clutch mechanism C.

A shifter 24 engaging and supporting the clutch sleeve 21 is slidably supported by a pair of support shafts 25. The shifter 24 contacts a pair of cam faces 26A of a rotary cam 26 rotatable coaxially with an axis of the spool 3, thereby to operate the clutch sleeve 21. The rotary cam 26 includes an engaging pin 28 engaged with a link member 27, which causes a control pin 4A of the clutch control member 4 to contact the link member 27. As a result, the link member 27 is rotated to operate the clutch control member 4, thereby to drive the clutch sleeve 21.

Compression springs 29 are fitted on the support shafts 25 to compress and urge the shifter 24 to engage the clutch mechanism C. A toggle spring 30 acts on the rotary cam 26 to selectively maintain the rotary cam 26 in a clutching position and a declutching position. A toggle spring 31 acts on a return arm 33 associated with the rotary cam 26 as the clutch mechanism C is in a disengaging position to cause an end of the return arm 33 to engage a return control wheel 32 formed on the handle shaft 13. When the clutch mechanism C is set to the disengaging position, the return arm 33 is moved to a position to engage the wheel 32 under an urging force of the toggle spring 31 and receives a rotating force of the wheel 32 rotated by a winding-up operation of the handle 5. Then, the return arm 33 is moved away from the wheel 32 to return the rotary cam 26 to the clutching position to engage the clutch mechanism C.

An operation to disengage the clutch mechanism C is effected by pressing down the clutch control member 4 by a thumb or a finger. Thus, the control pin 4A formed integral with the clutch control member 4 contacts the link member 27 which in turn moves along a guide member 34 in an arc. The link member 27 rotates the rotary cam 26, and the clutch sleeve 21 is pressed by the cam faces 26A of the rotary cam 26 to be operated to the declutching position. When the clutch mechanism C is engaged, the handle 5 is rotated in a direction to wind up the fishing line to allow a tooth 32A of the wheel 32 to exert a pressing force on the return arm 33. The rotary cam 26 is rotated by this return operation of the return arm 33 to cause the cam faces 26A to retract from the position to press the clutch sleeve 21, which causes the shifter 24 to be operated under an urging force of the compression springs 29, thereby to engage the clutch mechanism C.

Referring to FIGS. 1 through 3 and 7, a centrifugal brake mechanism includes collars 37 and an annular friction member 38. The collars 37 are slidably fitted on shafts 36 provided on a holder 35 fixed to the spool shaft 19. The annular friction member 38 is arranged outwardly of a locus of rotation of the collars 37.

The left-hand first case 9 is separable from the first frame 8, and, after separation, supported to be pivotable about a shaft member 39 mounted forwardly thereof. Thus, the first case 9 is not completely separated from the first frame 8, but widely opens a side of the first frame 8 to facilitate removal of the spool 3.

Figure 1:
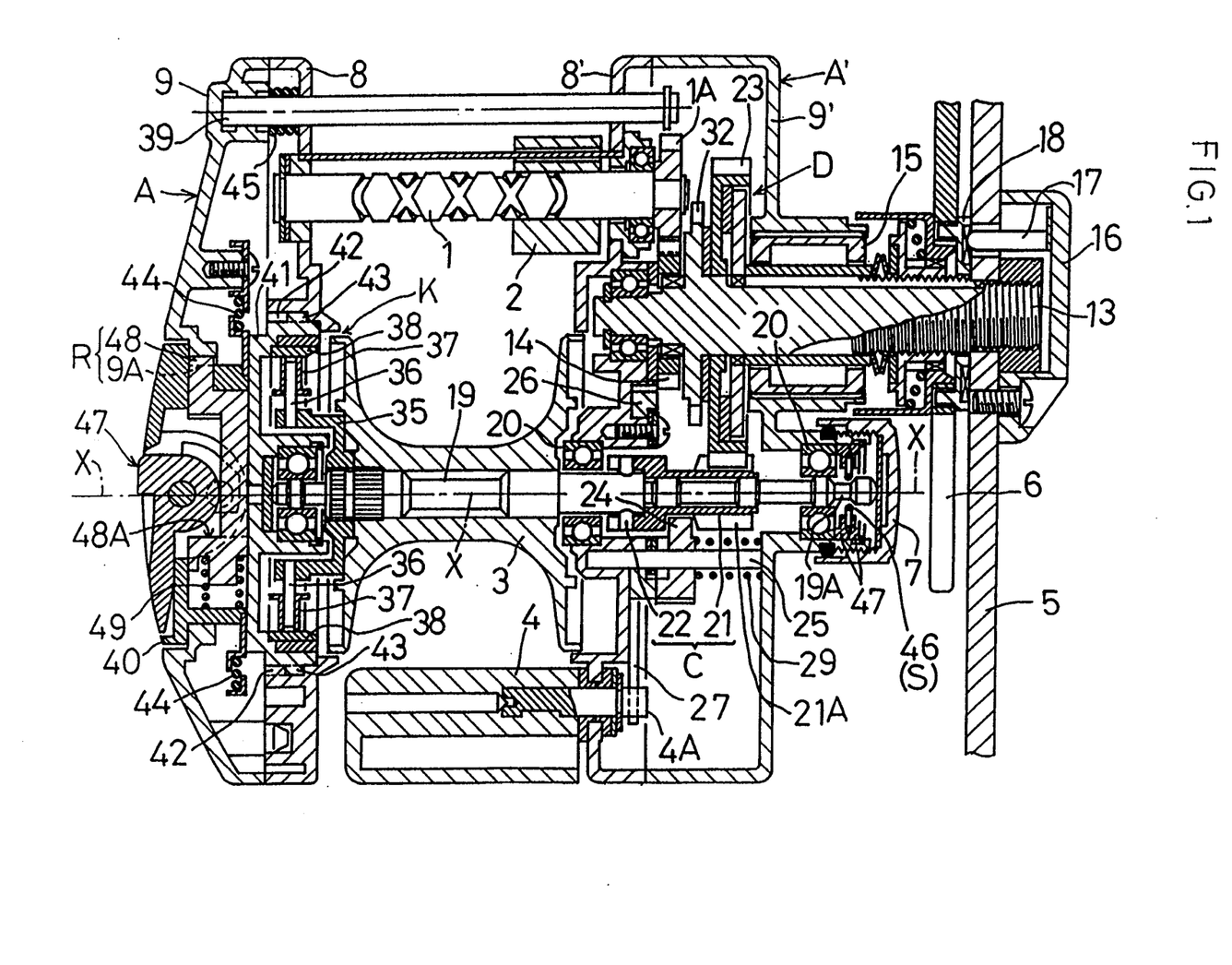
FIG. 1 is a plan view in cross section of a reel.
Figure 2:
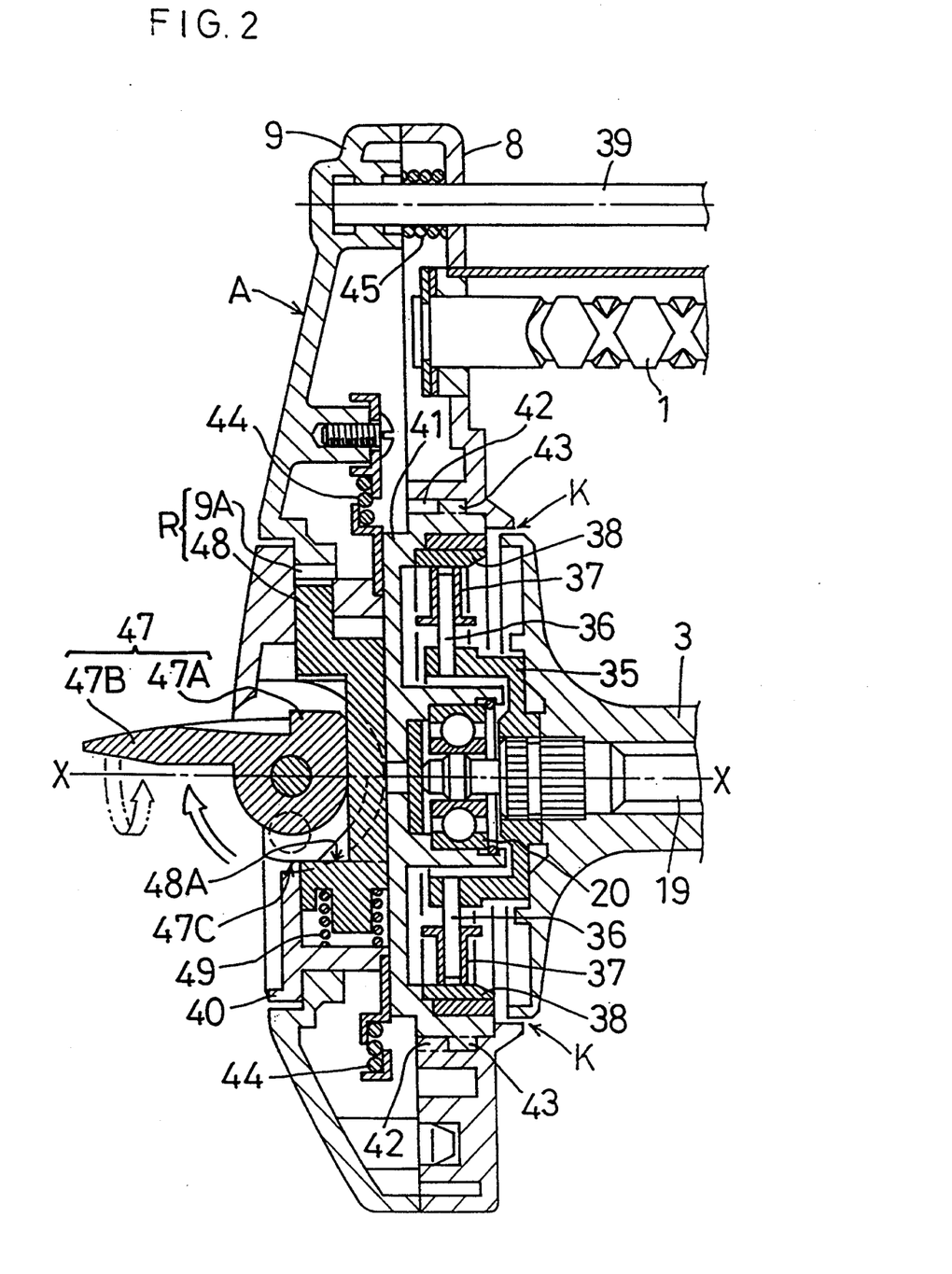
FIG. 2 is a plan view in cross section of the reel showing an unlock control member switched to an unlocking position.
Figure 3:
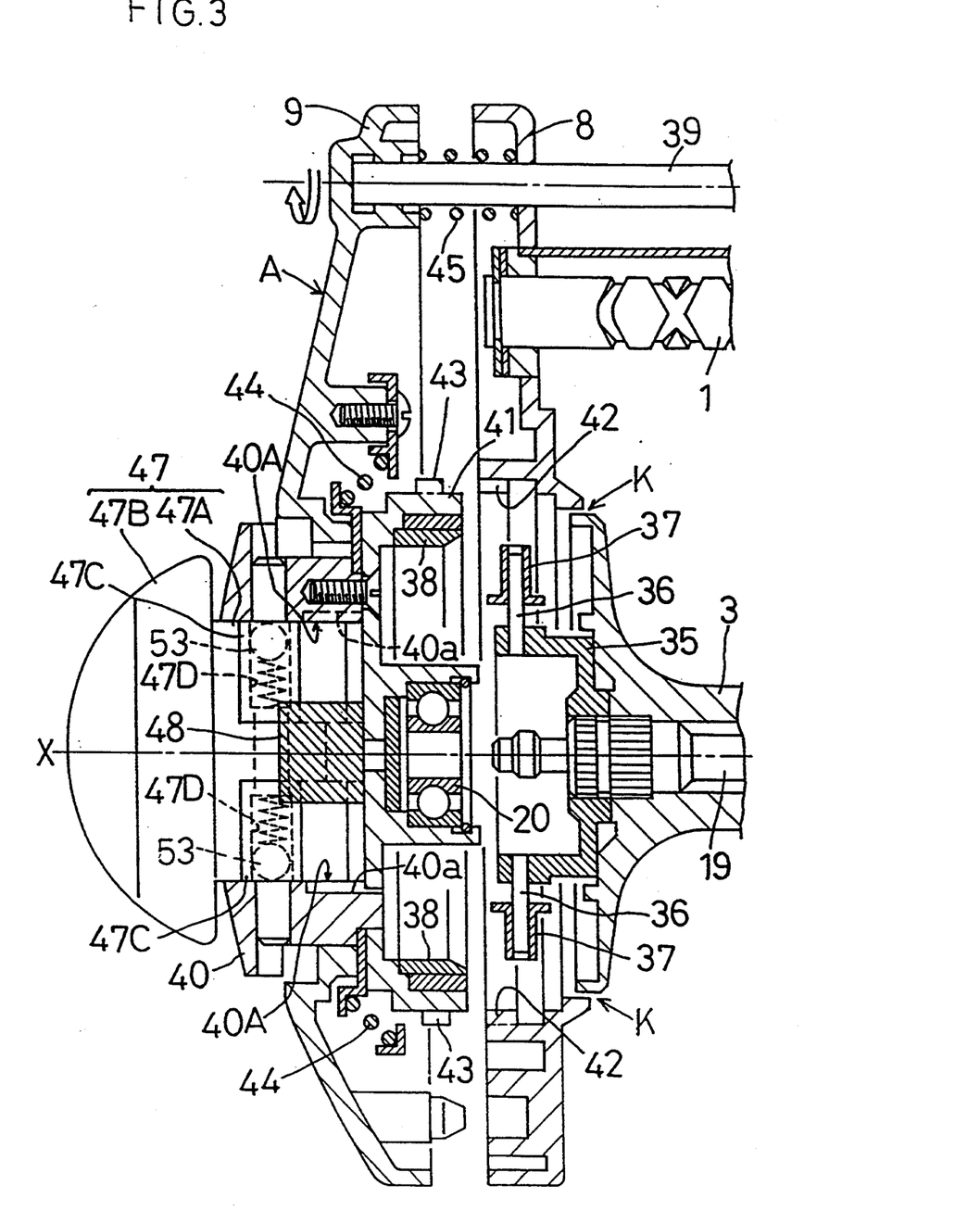
FIG. 3 is a plan view in cross section in which the unlock control member is rotated about an axis thereof to remove a lid from a first frame.
Figure 4:
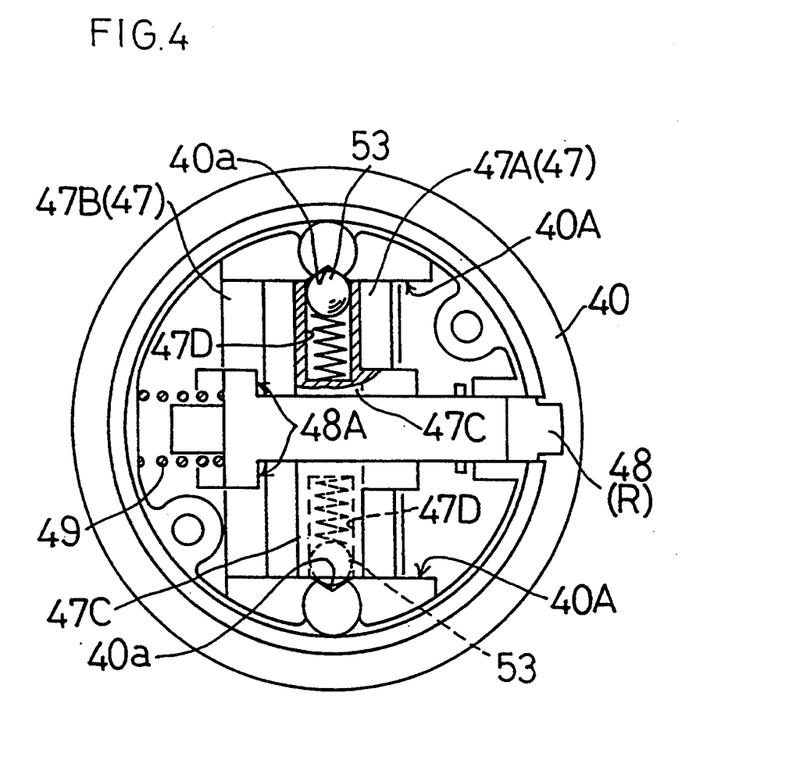
FIG. 4 is a side view in vertical section showing a lock mechanism for the lid.
Figure 5:
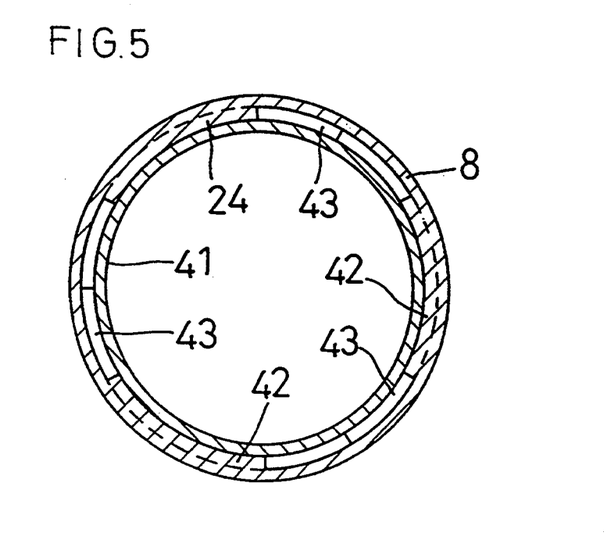
FIG. 5 is a sectional view showing engaging elements and engaging pawls.

More particularly, referring to FIGS. 1 through 4, an openable and closable lid 40 is mounted on the first case 9 to be pivotable coaxially with the axis X of the spool 3 and at the same time shiftable in an axial direction of the spool 3. A lock mechanism R maintains the lid 40 in a closed position as attached to the first case 9. The lock mechanism R is mounted on the lid 40 together with an unlock control member 47 for releasing a locking position of the lock mechanism R. A disk member 41 is integral with the lid 40 and includes the bearings 20 supporting the spool shaft 19 and the friction member 38. As shown in FIGS. 2, 3 and 5, the disk member 41 formed integral with the lid 40 defines a plurality of pawls 43 on an outer periphery thereof, while the first frame 8 defines a plurality of engaging elements 42 in an inner periphery of an opening K defined in a center of the first frame 8. The engaging elements 42 are engageable with and disengageable from the pawls 43 with pivotal movement of the lid 40 to select a position to fix the first case 9 to the first frame 8 and a position to move the first case 9 away from the first frame 8. The engaging elements 42 and the pawls 43 are engageable with and disengageable from each other by pivotal movement of a relatively small angle, i.e. around 10° to 30°.

As seen from FIG. 3, when the engaging elements 42 are disengaged from the pawls 43 by pivotal movement of the lid 40, the lid 40 and the disk member 41 are pushed out under an urging force of a spring 44 and at the same time the first case 9 is pushed out to move away from the first frame 8 under an urging force of a spring 45 fitted on the shaft member 39.

The spool 3 is removable through the opening K revealed by separating the first case 9 from the first frame 8. A spring member 46 engages a reduced diameter portion 19A defined adjacent to an end portion of the spool shaft 19, thereby to prevent the first case 9 from falling off the reel by gravity when the first case 9 is opened as described above.

Figure 6:
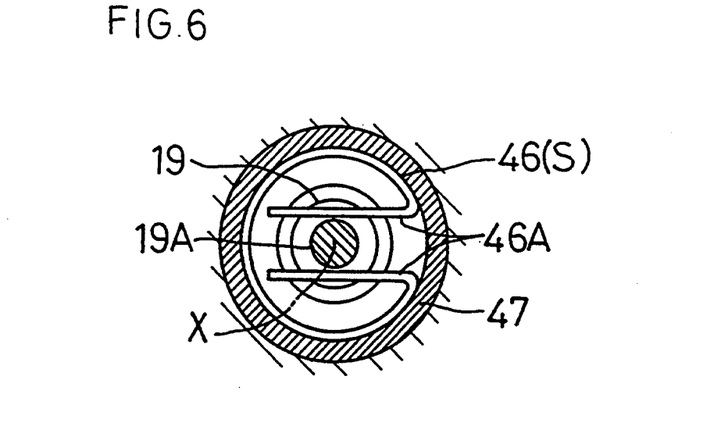
FIG. 6 is a view showing a shape of a spring.
Figure 7:
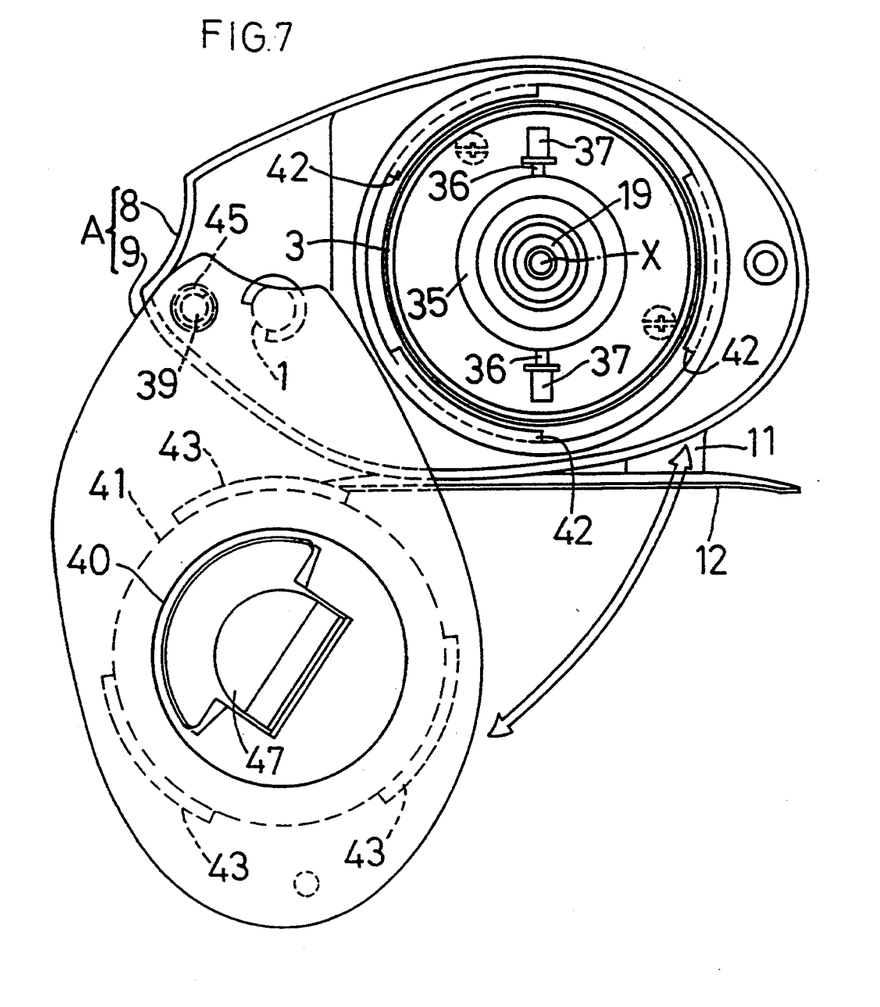
FIG. 7 is a side view of the reel with a first case being opened.

As shown in FIG. 6, the spring member 46 includes a pair of engaging portions 46A arranged to sandwich the reduced diameter portion 19A, and is provided in the vicinity of the cast controller 7 through a ring holder 47. This spring member 46 is elastically deformed as the spool 3 is manually removed and inserted, thereby to engage and disengage from the reduced diameter portion 19A.

Next, the lock mechanism R for locking the lid 40 and the unlock control member 47 will be described hereinafter. Referring to FIGS. 1 through 4, the lock mechanism R is provided inside the lid 40, and includes an engaging member 48 defined in the lid 40 and held in a recess to be slidable, an urging spring 49 to project and urge the engaging member 48 in one direction, and engaged recesses 9A defined in three positions of an inner wall of the first case 9 to engage an end of the engaging member 48 projecting from a side face of the lid 40. The unlock control member 47 is supported to oscillate in a sliding direction of the engaging member 48 adjacent to an outer face of the lid 40. The unlock control member 47 includes a proximal portion 47A having a circular cross section and a segmental distal control portion 47B. The proximal portion 47A has flat planes 47C at opposite sides thereof. The unlock control member 47 assumes a position along the outer face of the lid 40 at a contained position thereof corresponding to the locking position, while assuming a raised position projecting from the outer face of the lid 40 at an unlocking position. The engaging member 48 defines a recess receiving the proximal portion 47A of the unlock control member 47. The recess defines stepwise faces 48A to be contactable with the flat planes 47C of the unlock control member 47. Each of the flat plane 47C is spaced away from the stepwise face 48A with the unlock control member 47 being in the contained position, which allows the engaging member 48 to receive an urging force of the spring 49 and engage into the engaged recess 9A. When the unlock control member 47 is rotated and raised from this position, the flat plane 47C contacts the stepwise face 48A in the course of rotation to cause the engaging member 48 to move away from the engaged recess 9A to maintain the unlocking position.

A structure for maintaining the unlock control member 47 in the contained position will be set forth below.

A sideways bore 47D is defined each of the proximal portions 47A provided in opposite sides of the engaging member 48 to receive a spring-ball mechanism 53. Guide faces are defined in an inner face of the lid 40 opposing the proximal portions 47A of the unlock control member 47 each for guiding the spring-ball mechanism 53 as the unlock control member 47 is oscillated. Also, recess portions 40a are defined in positions corresponding to the contained position of the unlock control member 47 each for engaging balls of the spring-ball mechanism 53. The unlock control member 47 is maintained in the contained position under engagement between the recess portion 40a and the spring-ball mechanism 53.

In short, when the lid 40 is attached to a predetermined position and the unlock control member 47 is set to the contained position, the flat planes 47C are moved away from the stepwise faces 48A, thereby to allow the engaging member 48 to be free and receive the urging force of the spring 49 to project and engage the engaged recess 9A, as a result of which the locking position is established. In order for the lid 40 to be removed, the unlock control member 47 is raised to assume the unlocking position. Then, the flat planes 47C contact the stepwise faces 48A in the course of rotation of the unlock control member, thereby to retract the engaging member 48 and break engagement between the engaging member and the engaged recess. The angler can remove the lid 40 by rotating the unlock control member 47 with the lid 40 without shifting her or his hand.

Figure 10:
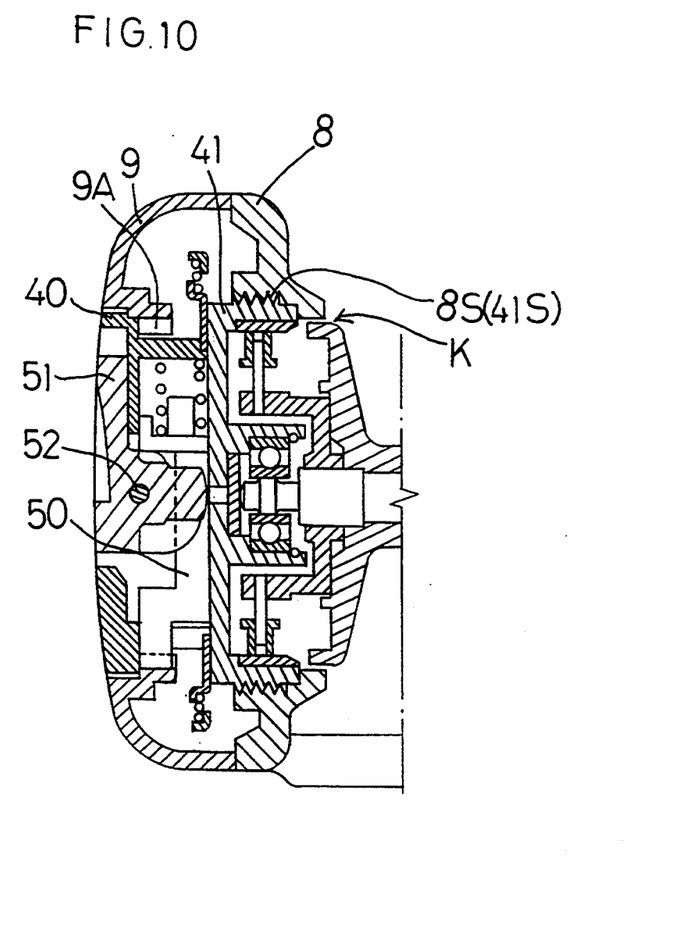
FIG. 10 is a partially broken side view in vertical section showing another embodiment different from the embodiment as shown in FIG. 1 having a screw structure for the first frame of the lid.
Figure 11:
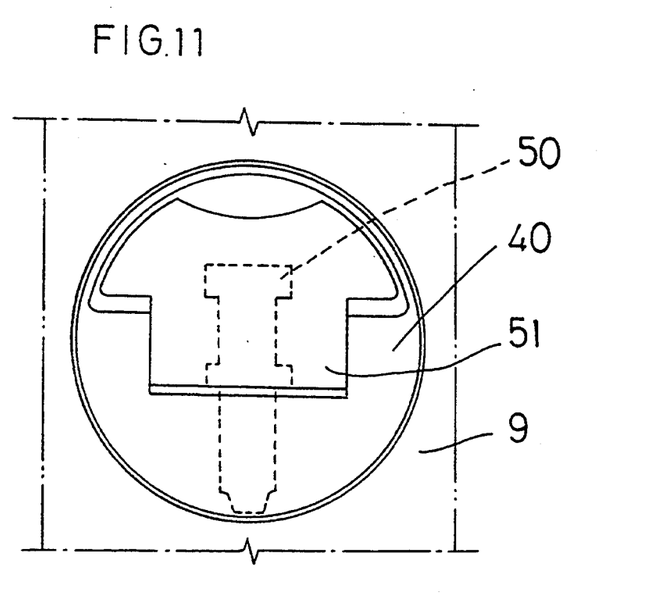
FIG. 11 is a front view of the lid as shown in FIG. 10.

Apart form the foregoing embodiment as described above, the reel according to the present invention may be modified as follows:

The lid 40 may be attached to or detached from the first frame 8 by a screw structure. More particularly, referring to FIGS. 10 to 12, the first case 9 holds a rotatable knob 40 acting as a lid member. The knob 40 have a disk member 41 attached to an inner face thereof and defining a male threaded portion 41S screwed to a female threaded portion 8S defined in an inner periphery of an opening K of the first frame 8. Numeral 50 denotes an engaging member engageable with an engaged portion 9A defined in the first case 9, while numeral 51 denotes an unlock control member rotatable about an axis 52 to control the engaging member 50.

Figure 12:
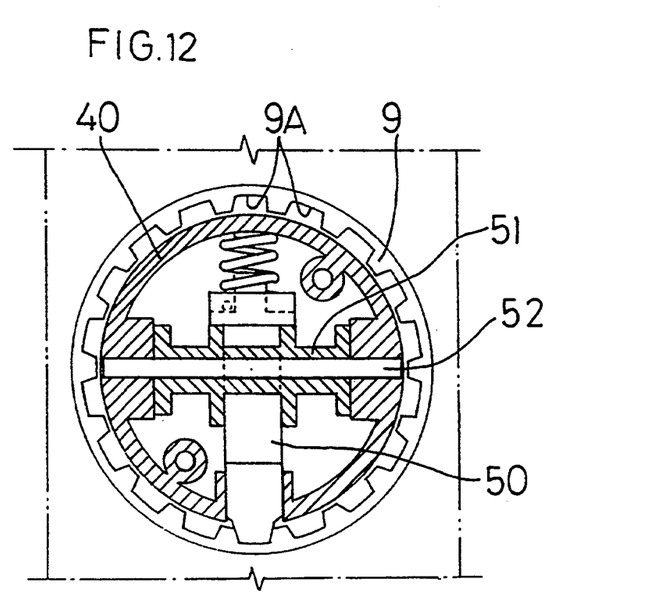
FIG. 12 is a front view in vertical section showing a locking structure provided in the lid as shown in FIG. 10.

In this modified embodiment, a plurality of engaged recesses may be provided to allow the lock mechanism R to function as a retainer mechanism for the screw structure. That is to say, as shown in FIG. 12, the first case 9 includes engaged recesses 9A like gear teeth are defined in an inner wall face thereof corresponding to the lid 40 to be engageable with the engaging member 50 in any phases.

Further, a right side body A' having the handle may be openable. In this case, the conventional structure may be employed in which only a lid 40 is openable and the side body per se is not openable. On the other hand, the side body per se may be opened by operating a plurality of bolts.

What is claimed is:

1. A baitcasting reel comprising:
   a rotary member for taking up a fishing line thereto;
   right and left side bodies arranged on opposite sides of said rotary member for supporting said rotary member therebetween;
   an opening defined in one of said right and left side bodies for allowing said rotary member to be removed therethrough;
   an openable and closable case for exposing and closing said opening;
   a lid movably mounted on said case, and means formed on said lid and said one of said right and left side bodies for retaining said case in a closed position which corresponds to a retaining position of said lid;
   a lock mechanism for locking said lid in said retaining position, including engaging means and engaged means;
   said engaging means being provided to said lid;
   said engaged means being provided on said one of said side bodies and being engageable with and disengageable from said engaging means to selectively lock said lid in said retaining position;
   an unlock control member on said lid, operable to act on said engaging means to disengage said engaging means from said engaged means, thereby to allow said lid to be moved from said retaining position to a release position which corresponds to an exposed position of said case.

2. A baitcasting reel as claimed in claim 1 further including a spring, wherein said engaging means is slidably held by said lid and said spring urges said engaging means to engage said engaged means, said spring interposed between said engaging means and said lid.

3. A baitcasting reel as claimed in claim 1, wherein said engaged means is provided in a plurality of positions in a substantially cylindrical inner periphery of said opening.

4. A baitcasting reel as claimed in claim 1, wherein said unlock control member is pivotably attached to said lid.

5. A baitcasting reel as claimed in claim 1, wherein said lock mechanism includes engaging flat planes defined in said unlock control member, and stepwise faces defined in said engaging means to be engageable with said flat planes, said engaging means being slidably retracted and moved away from said engaged means by rotation of said unlock control member.

6. A baitcasting reel as claimed in claim 1, wherein said means for retaining comprises a plurality of pawls engageable with and disengageable from a plurality of engaging elements defined on the inner periphery of said opening, said lid being rotatable about an axis of said rotary member, thereby to be attachable to and detachable from said opening.

7. A baitcasting reel as defined in claim 1, wherein said lid is threaded to said opening and is detachably attached to said opening by rotation about an axis of said rotary member.

8. A baitcasting reel comprising:
   a rotary member for taking up a fishing line thereto;
   right and left side bodies arranged on opposite sides of said rotary member for supporting said rotary member therebetween;
   an opening defined in one of said side bodies for allowing said rotary member to be removed therethrough;
   an openable and closable case for exposing and closing said opening;
   a lid movably mounted on said case, and means formed on said lid and said one of said right and left side bodies for retaining said case in a closed position which corresponds to a retaining position of said lid;
   a lock mechanism for locking said lid in said retaining position, including engaging means and engaged means;
   said engaging means being provided to said lid;
   said engaging means being provided on said one of said side bodies and being engageable with and disengageable from said engaging means to selectively lock said lid in said retaining position;
   an unlock control member on said lid movable from a storing position to an operable position to act on said engaging means to disengage said engaging means from said engaged means, thereby to allow said lid to be moved from said retaining position to a release position which corresponds to an exposed position of said case; and
   a spring-ball mechanism and a recess portion provided between said lid and said unlock control member, said spring-ball mechanism and said recess portion being engageable with each other, thereby to maintain said unlock control member in said storing position.

9. A baitcasting reel comprising:
   a rotary member for taking up a fishing line thereto;
   right and left side bodies arranged in opposite sides of said rotary member for supporting said rotary member therebetween, each of said side bodies having a frame and a case;
   said frame being disposed adjacent to said rotary member;
   said case enclosing an outer side of said frame and being held by a shaft member extending from a reel body parallel to an axis of the rotary member, said case being pivotable about said axis of the shaft member and movable away from said frame in an axial direction of said shaft member under an urging force of a first spring without falling off said shaft member;
   an opening defined in one of said side bodies for allowing said rotary member to be removed therethrough;
   a rotatable lid held by said case to be attachable to and detachable from said frame and urged to move away from said frame by a second spring, said lid being attached to said frame thereby to attach said case to said frame, said lid being removed from said frame thereby to move said case away from said frame in which said case is pivoted about the axis of said shaft member to expose said opening;

a lock mechanism including engaging means and engaged means;

said engaging means provided to said lid for locking said lock mechanism in a locking position thereof;

said engaged means provided to one of said side bodies and engageable with and disengageable from said engaging means;

an unlock control member operable to act on said engaging means to disengage said engaging means from said engaged means, thereby to move said lock mechanism from said locking position to an unlocking position.

10. A baitcasting reel comprising:

a side body including a frame and a case;

a fixing mechanism for fixing said case to said frame;

a lock mechanism for maintaining a fixed position between said case and said frame established by said fixing mechanism; and an unlock control member operable to move in one direction to place said fixing mechanism in the fixed position thereby to attach said case to said frame, while being operable to move in the opposite direction to unlock the fixed position and place said fixing mechanism in a release position thereby to select between a first position to allow said case to be removed from said frame and a second position to prevent said unlock control member from moving between the fixed position and the release position;

wherein said lock mechanism is interlocked with said unlock control member to select between an unlocking position at the first position and a locking position at the second position.

* * * * *